United States Patent [19]

Doughty

[11] 4,026,366
[45] May 31, 1977

[54] PLANT FENDER OR GUARD FOR CULTIVATORS

[76] Inventor: James M. Doughty, Rte. 2, Wingo, Ky. 42088

[22] Filed: Mar. 15, 1976

[21] Appl. No.: 667,034

[52] U.S. Cl. .............................. 172/511; 172/512
[51] Int. Cl.² .................................. A01B 17/00
[58] Field of Search ............ 172/511, 512, 513, 81, 172/112

[56] References Cited

UNITED STATES PATENTS

| | | | |
|---|---|---|---|
| 78,799 | 6/1868 | Garrett | 172/511 |
| 111,631 | 2/1871 | Gillespie | 172/511 |
| 293,465 | 2/1884 | Hopkins | 172/511 |
| 688,877 | 12/1901 | McKinnon | 172/511 |
| 2,805,614 | 9/1957 | Lipetzky | 172/511 |

Primary Examiner—Paul E. Shapiro
Attorney, Agent, or Firm—B. P. Fishburne, Jr.

[57] ABSTRACT

A floating plant guard or fender for cultivators formed of rod components straddles small plants in rows and prevents the plants from being damaged or buried by the action of the cultivator tines in the soil. The plant guards are wider at the front than at the back so that they can funnel fine soil around the plants without covering them to provide a mulch and to smother small weeds close to the plants. The rod construction renders the plants visible to the farmer on the tractor at all times. The guards have a floating suspension from a tool bar means so that they will not be obstructed by ground irregularities or foreign objects. Adjustable side grid attachments for the guards allow finer grading or sifting of soil by regulating the spaces between bars of the guard bodies.

1 Claim, 5 Drawing Figures

PLANT FENDER OR GUARD FOR CULTIVATORS

BACKGROUND OF THE INVENTION

Plant guards for cultivators are known in the prior art and examples thereof are shown in U.S. Pat. Nos. 2,597,111; 2,805,614 and 3,155,169.

The object of this invention is to improve on the prior art by providing more efficient plant guard or shield which will not only fully protect the plants of a row crop from injury or from complete covering with soil in their early stage of development but will enable the farmer, during a single pass of the cultivator, to funnel graded or sifted fine soil around the small plants in a controlled manner for proper plant nourishment by forming a mulch and also for the purpose of killing small weeds.

Toward these ends, the plant guards constituting the invention are suspended floatingly from a tool bar means and are formed of rod stock as an open grid through which the plants can always be visibly observed. The inverted U-shaped guards are tapered toward their rear ends so that fine soil will be gently funneled or piled around the bottoms of the small plants without covering them regardless of the forward speed of the tractor. Vertically adjustable side grid attachments for the guard or fender bodies enable still finer gradation of the soil or sifting during movement of the cultivator along the rows of plants. A double soil grading action is obtained by use of the side grid attachments which are spaced somewhat from the opposite sides of the guards.

Other features and advantages of the invention will become apparent during the course of the following detailed description.

BRIEF DESCRIPTION OF DRAWING FIGURES

DETAILED DESCRIPTION

Figure 1:
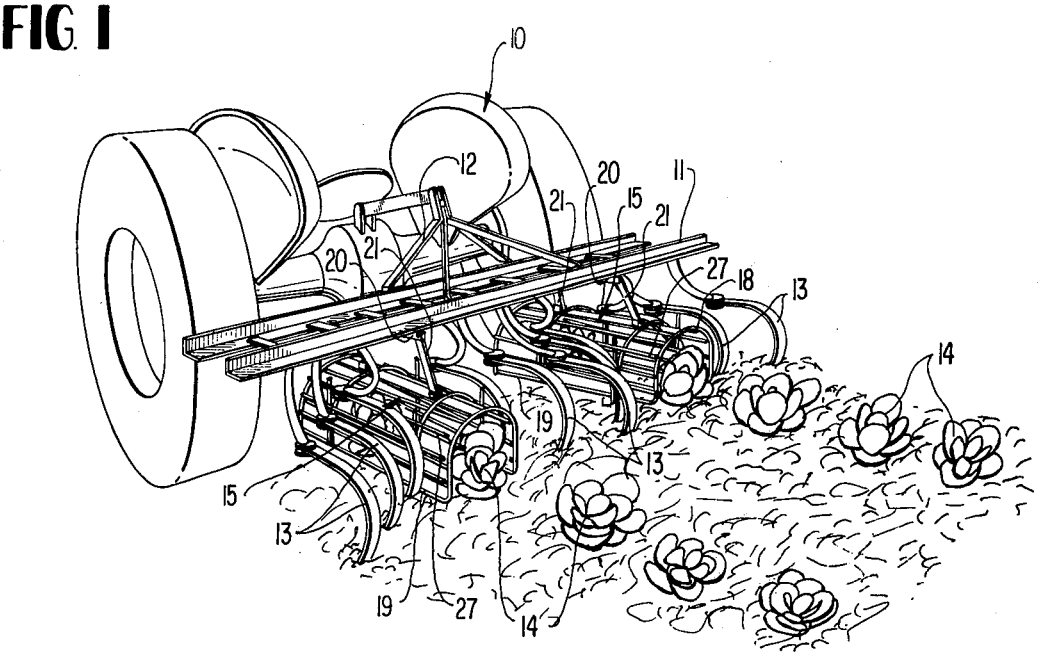
FIG. 1 is a perspective view of the invention showing the use thereof during cultivation of a row crop.
Figure 2:
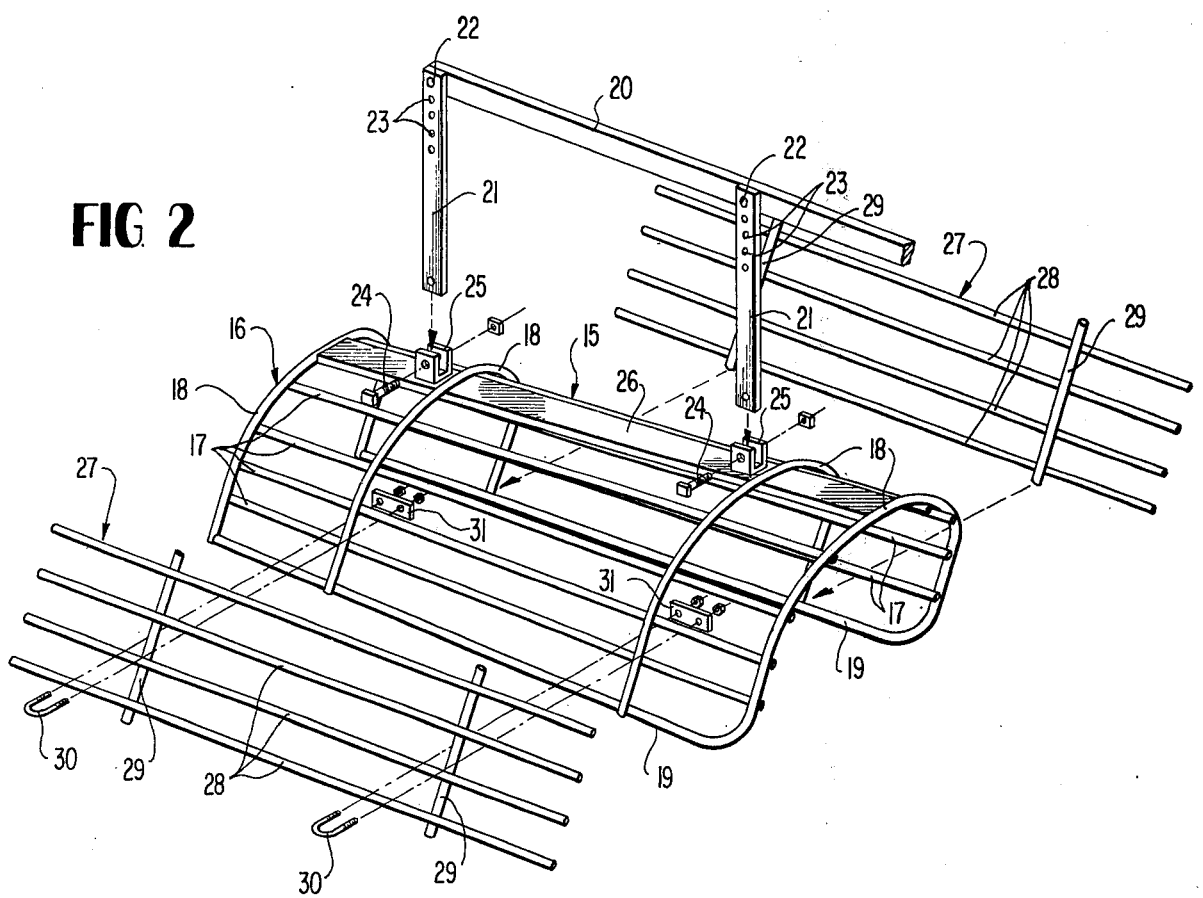
FIG. 2 is an exploded perspective view of the invention.

Referring to the drawings in detail wherein like numerals designate like parts, the numeral 10 designates a farm tractor having an implement bar means 11 carried by the customary hydraulically operated tractor lift or three point hitch designated by the numeral 12. The implement bar 11 carries cultivator teeth or tines 13 rearwardly thereof arranged in laterally spaced groups between plants 14 of a row crop. During the normal cultivating procedure, as the tines 13 pass between the rows of plants, inevitably they will throw soil onto the small plants tending to damage or bury them, and this leads to the necessity for some form of plant guard or shield moving with the tractor and cultivator means to protect the plants 14.

According to the present invention, a plant guard 15 for each row of plants 14 is carried by the tool bar means 11 between each group of cultivator tines 13. Each plant guard comprises an inverted U-shaped tunnel-like guard body 16 preferably formed of welded rod stock and being elongated and being open at its forward and rear ends and at its bottom. The guard body 16 tapers gradually from its forward to its rear end, the forward end being wider than the rear end. The purpose of this tapering is to cause each plant guard to funnel or pile fine soil around the bases of the plants 14 during cultivation in a controlled manner without burying or otherwise damaging the plants.

Each guard body 16 has a plurality of evenly spaced parallel longitudinal rods 17 joined by welding to forward, rear and intermediate longitudinally spaced inverted U-shaped frames 18. The resulting construction is quite rigid and very sturdy and durable. The lowermost longitudinal rods 19 of each guard body 16 serve as ground runners during the operation of the invention. The described construction of the plant guard bodies forms an open gridwork of rods which allows ready viewing of the plants at all times as well as promoting a soil grading or sifting action, to be further described. Relatively large uniform width spaces are formed between the longitudinal rods 17 at the opposite sides of each guard through which relatively fine soil thrown up by the cultivator teeth 13 can enter the guard, and by means of which larger soil particles or lumps are excluded.

Each plant guard or shield 15 is floatingly suspended from the implement bar 11 on a horizontal longitudinal bar 20 thereof through a pair of longitudinally spaced suspension links 21 whose tops are pivoted at 22 to the bar 20. Several vertical adjustment openings 23 are provided in each link 21, as shown. The lower ends of the suspension links 21 are similarly pivoted by means of elements 24 to apertured lugs 25 mounted on a front-to-back plate 26, welded to the top of each guard or shield 15. By virtue of this arrangement, the several plant guards 15 are enabled to slide on the soil resting on their lower runners 19 and to rise and fall with ground irregularities and pass over any obstructions encountered, such as rocks, without damaging the equipment.

A very important feature of the invention lies in the provision on each plant guard or fender 15 of a pair of opposite side adjustable and detachable soil grading or sifting grids 27, also formed of welded rod stock. Each side adjustable grid 27 comprises a plurality of equidistantly spaced parallel longitudinal rods 28 welded to a pair of vertical rods 29 or frame members. The grids 27 are of equal length with the guard body 16 and are adapted to span or cover the two vertical sides of the guard body substantially, as best shown in FIGS. 4 and 5.

The side grids 27 are adjustably mounted fixedly on each guard body 16 by clamping U-bolts 30 and cooperating clamp plates 31. The U-bolts 30 engage about the vertical rods 29 of the grids 27 and the clamp plates 31 lie inwardly of the sides of the guard body 16, as shown. The arrangement is such that the grids 27 can be raised or lowered on the sides of the guard or shield 16 to regulate the soil grading spaces between the longitudinal rods 17, as shown in FIG. 5, and with broken lines in FIG. 4. In this manner, the soil grading or sifting action of the guards may be adjusted to allow relatively finer or coarser soil to enter through the sides of the guards during cultivating.

Figure 3:
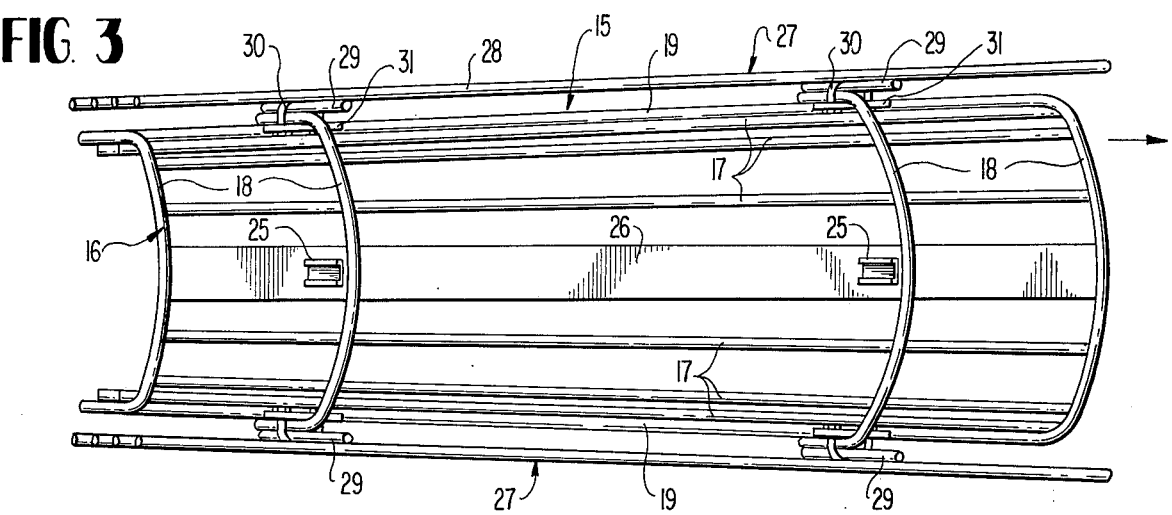
FIG. 3 is a plan view of the invention.
Figure 4:
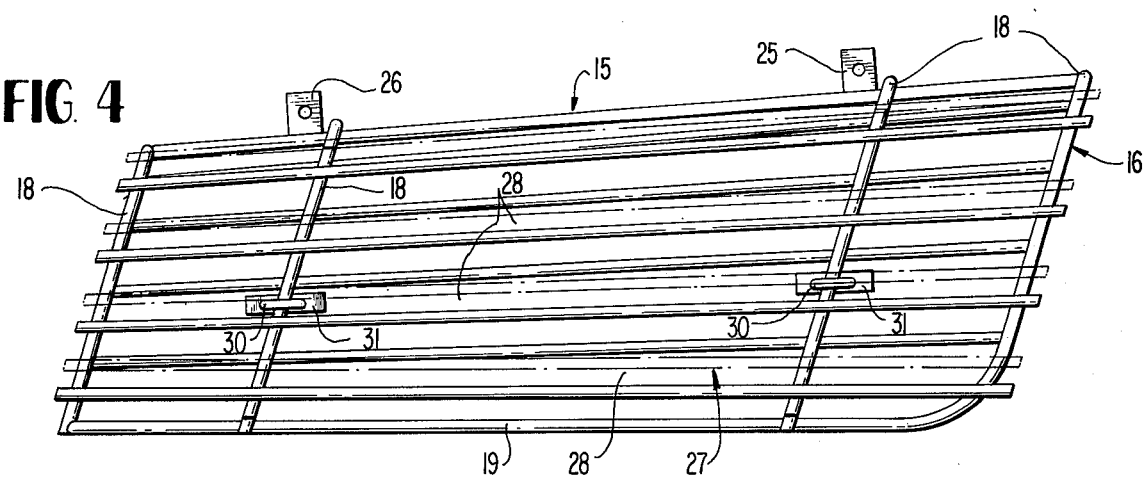
FIG. 4 is a side elevational view thereof.
Figure 5:
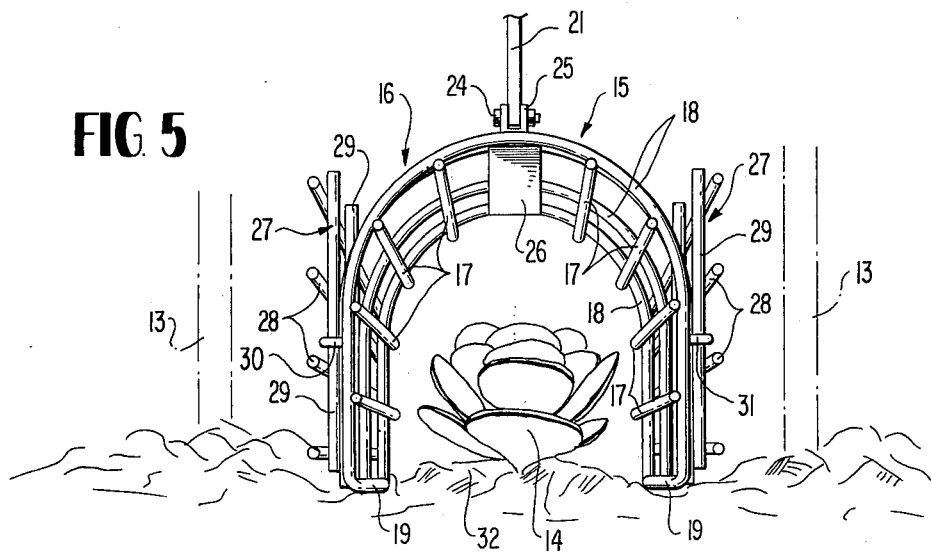
FIG. 5 is an end elevational view looking rearwardly from the forward end of the plant guard or fender.

FIG. 5 illustrates how fine soil is piled up or funneled around the base of each plant 14 as at 32 due to the longitudinally tapered configuration of the guard 15 shown clearly in FIGS. 3 to 5. Since the rear end of the guard is narrower than the forward end, movement of the guard along the plant row forces fine soil inwardly toward and around the main stalk of each plant in a gentle manner without damaging or burying the plant. Simultaneously, the side variable size interstices formed by the fixed rods 17 and adjustable grid rods 18 act to grade or sift soil being thrown inwardly toward the plants by the action of the cultivator tines 13. Since the grids 27 are spaced outwardly somewhat from the opposite sides of each guard body 16 as clearly shown in FIG. 3, a double soil grading action is provided at each side of the plant row during cultivation.

As the small plants grow in size, the guards or shields 16 may be raised by utilizing the adjustment openings 23 and in this way plants up to about 20 inches high may be cultivated while being protected by the invention. The guards 15 may be removed from the cultivator as the plants reach maturity and protection is no longer necessary.

It is believed that the advantages which the invention possesses over the prior art will now be apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A plant guard for cultivators comprising a plant guard body of inverted U-shape and having spaced vertical sides and an arcuate top and being open at its opposite ends and bottom to form a plant through passage, said plant guard body being wider at its forward end than at its rear end and tapering gradually longitudinally between such ends, said plant guard body constructed from spaced rod elements including approximately horizontal longitudinal rod elements and arched frame elements secured to and supporting said longitudinal rod elements in a fixed spaced relationship on the plant guard body, fore and aft pivotal suspension links connected with the top of the plant guard body for suspending it floatingly from an implement bar between adjacent groups of cultivator tines, a pair of separately formed substantially flat side adjustable grids each including a plurality of fixedly spaced substantially horizontal rods and at least a pair of vertical rods joined to the horizontal rods of each grid in longitudinally spaced relation whereby the vertical rods are laterally adjacent opposite sides of said arched frame elements, and clamping U-bolts and U-bolt retainer plates embracing adjacent vertical rods of said grids and sides of said arched frame elements and securing said grids to the outer sides of said inverted U-shaped plant guard body in such a way that the grids may be bodily raised and lowered on said guard body and clamped by the U-bolts in selected height adjusted positions, said horizontal rods of the grids coacting with the horizontal longitudinal rod elements of said guard body to produce variable soil grading slots in the opposite sides of said plant guard.

* * * * *